Aug. 4, 1959 R. B. TROUSDALE 2,898,526

TRIGGER CIRCUIT FOR USE IN TIME DIVISION MULTIPLEX SYSTEMS

Filed May 16, 1956

INVENTOR.
ROBERT B. TROUSDALE
BY F. H. Henson
AGENT

United States Patent Office 2,898,526

Patented Aug. 4, 1959

2,898,526

TRIGGER CIRCUIT FOR USE IN TIME DIVISION MULTIPLEX SYSTEMS

Robert B. Trousdale, Webster, N.Y., assignor to General Dynamics Corporation, Rochester, N.Y., a corporation of Delaware Application May 16, 1956, Serial No. 585,232

10 Claims. (Cl. 317—147)

This invention relates in general to time division multiplex systems and more particularly to trigger circuits for use in time division multiplex systems.

In time division multiplex systems it is often desirable to produce a continuous signal so long as control pulses appear in the time position of a particular line or circuit. For example, in time division multiplex telephone systems of the type disclosed in my copending application, Serial No. 492,068, filed March 4, 1955, and assigned to the same assignee as the present invention, it is necessary to connect a source of ringing power to a selected called line so long as ringing control pulses are developed in the time position of that line. The connector which is controlled by the calling line to select the time position of the called line serves to develop ringing control pulses in the time position of the selected called line until the call is answered. When the call is answered, the development of ringing control pulses is terminated and the ringing source is disconnected from the called line.

In the system disclosed in the above-identified application, each ringing control pulse in the time position of a particular line is amplified by a monostable oscillator circuit in the line circuit associated with that line and applied to the grid of a cold cathode tube associated with that line. Ringing voltage is continuously applied to either the anode or cathode terminal of the tube and the other terminal of the tube is connected to one conductor of the line. The tube is fired when a ringing control pulse is applied to the grid of the tube at a time when the ringing voltage is of proper polarity. The tube is extinguished when the ringing voltage reverses polarity and is refired during the next cycle of ringing only if control pulses are still being developed. A system of this type has several disadvantages. First, the source of ringing must be limited to a maximum peak voltage which will not cause the tube to fire in the absence of grid control pulses. Also, the ringing voltage produced must be of sufficient value to compensate for the sixty volt drop in the conducting cold cathode gas tube. Thus, the magnitude of the controllable ringing voltage is somewhat limited.

It is desirable, therefore, to replace the cold cathode gas tubes in systems of this type with relays since relays are not subject to the above-mentioned limitations. To my knowledge, however, there has not been avialable a trigger circuit which has sufficient power output to maintain a relay operated so long as control pulses persist in a single time position in repetitive time position frames.

Accordingly, it is the general object of this invention to provide a new and improved trigger circuit for use in time division multiplex systems.

It is a more particular object of this invention to provide in a time division multiplex system a new and improved trigger circuit which has sufficient power output when triggered by a control pulse in a single time position in each of successive time position frames, to maintain a relay operated during the successive time position frames.

Briefly, the invention accomplishes the above cited objects by providing a bi-stable trigger circuit which is triggered to an "on" condition by a control pulse in one time position, and is triggered "off" by a pulse in a time position preceding said one time position in each time position frame. If, for example, the time position assigned for resetting the trigger circuit immediately precedes the time position used to trigger the circuit to its "on" condition, the relay, which is energized when the trigger circuit is in its "on" condition, is energized for all but one time position in each time position frame in which control pulses are developed.

Further objects and advantages of the invention will become apparent as the following description proceeds, and the features of novelty which characterize the invention will be pointed out in particularity in the claims annexed to and forming a part of this specification.

For a better understanding of the invention, reference may be had to the accompanying drawing which consists of two figures on a single sheet.

Before proceeding to a detailed analysis of the operation of the circuit, it is believed expedient to a more complete understanding of the invention to discuss the derivation of the pulses appearing on conductors $CH_N$, $CH_{N-1}$ and RC. The circuits which develop the pulses on these conductors have not been shown in this application since circuits suitable for this purpose are shown in complete detail in my copending application, Serial No. 585,186, filed May 16, 1956, and assigned to the same assignee as the present invention. In the telephone system disclosed in that application, a fifty kc. master oscillator is utilized to drive the first of seven stages of frequency divider circuits connected in tandem which stages together form a binary pulse generator. Two output signals of opposite phase are taken from each stage of the binary pulse generator and routed over fourteen output conductors to a channel pulse matrix circuit. The channel pulse matrix circuit is utilized to gate together pulses appearing on one hundred and twenty-eight unique combinations of seven conductors to form one hundred and twenty-eight channel pulses which each occur in an individual time position during each cycle of operation of the binary pulse generator.

With, for example, the first stage of the binary pulse generator driven at fifty kc., each channel pulse is twenty microseconds in duration and each time position or channel pulse frame consumes 2.56 milliseconds. Thus, it can be seen that the pulses appearing on any channel pulse conductor, such as $CH_N$, are twenty microseconds in duration and recur every 2.56 milliseconds. The channel pulses appearing on conductor $CH_{N-1}$ are also twenty microseconds in duration and appear in the time position immediately preceding time position $CH_N$.

Figure 1:
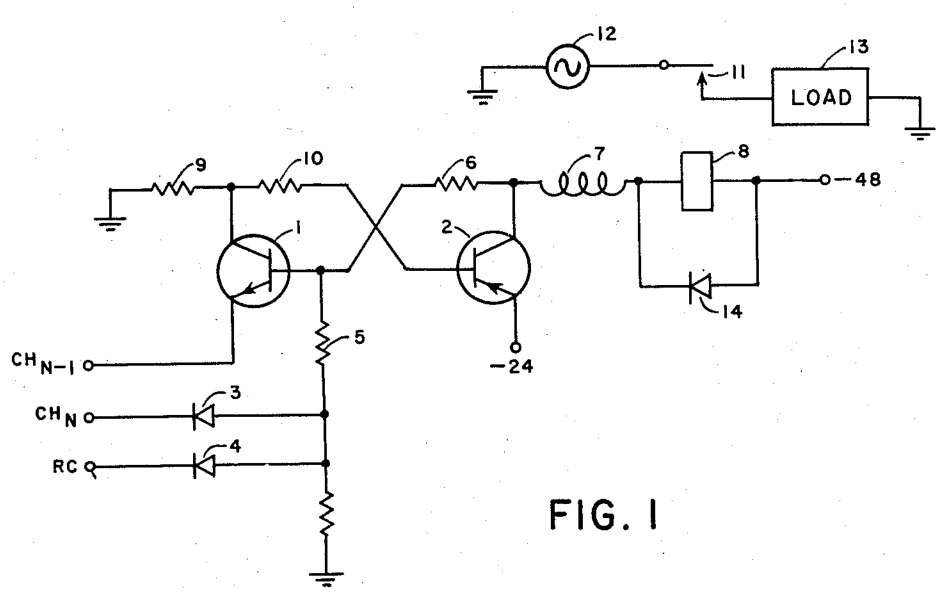
Fig. 1 shows a bi-stable trigger circuit for controlling the operation of a relay.
Figure 2:
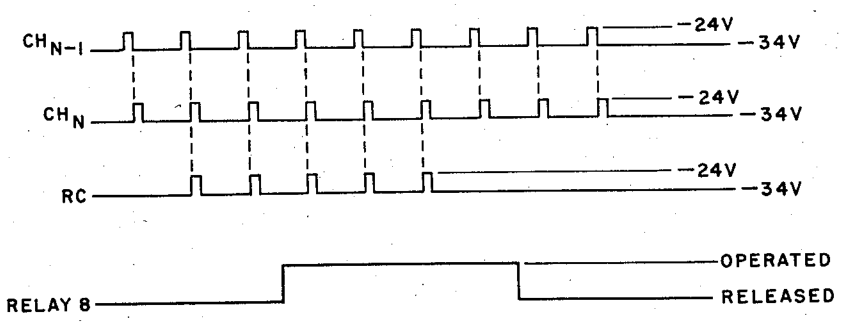
Fig. 2 is a pulse chart which shows the time relationship of pulses utilized to control the circuit of Fig. 1.

A bi-stable trigger circuit, shown in Fig. 1, is individually associated with each line of the system. Conductor $CH_{N-1}$ from the channel pulse matrix circuit is connected directly to the emitter electrode of transistor 1 in the bi-stable circuit, while the pulses appearing on conductor $CH_N$ from the channel pulse matrix are gated with ringing control pulses appearing on conductor RC by the action of the "and" gate for positive signals comprising diodes 3 and 4. Ringing control conductor RC, which is multipled to the "and" gates individually associated with each of the line circuits, carries ringing control pulses in the time positions of lines which are to be rung. Thus, when a ringing control pulse appearing on conductor RC coincides in time position with a channel pulse apearing on conductor $CH_N$, a trigger pulse is applied to the base of transistor 1. The pulses appearing on the various conductors are graphically illustrated in Fig. 2 of the drawings. All three conductors normally stand at minus thirty-four volts and rise to minus twenty-four volts during pulse periods.

Referring to Fig. 1, it can be seen that the bi-stable circuit comprises NPN junction transistor 1, which may be type GT692, and PNP junction transistor 2, which may be type 2N44. It is to be understood that the illustrated bi-stable circuit is intended as an example only and that a bi-stable trigger circuit utilizing gas or vacuum tubes could be used in the circuit. The illustrated bi-stable circuit is of the type in which both transistors are either conductive or both transistors are non-conductive.

Assume that the transistors are non-conductive and that conductors $CH_{N-1}$, $CH_N$ and RC stand at minus thirty-four volts. Under these conditions, the emitter of transistor 1 stands at minus thirty-four volts and the output signal from the "and" gate comprising diodes 3 and 4 also stands at minus thirty-four volts. Transistor 1 is non-conductive since its base is held slightly negative with respect to the potential of its emitter. The base of transistor 1 is returned to the output of the "and" gate through resistor 5 and to minus forty-eight volts through resistor 6, choke coil 7 and through the winding of relay 8. Relay 8 does not operate at this time because of the resistance value of resistors 5 and 6. It should be noted that transistor 2 is also non-conductive whenever transistor 1 is non-conductive since its base is positive with respect to the minus twenty-four volt potential of its emitter. The base of transistor 2 is returned to ground potential through resistors 9 and 10. During time position $CH_{N-1}$, the potential of conductor $CH_{N-1}$ rises to minus twenty-four volts. This has no effect on the setting of the bi-stable circuit but merely tends to drive transistor 1 further into cutoff.

During time position $CH_N$, a trigger pulse is applied to the bi-stable circuit only if there is a ringing control pulse in that time position on conductor RC. If a ringing control pulse is not present, the output signal from the "and" gate remains at minus thirty-four volts because of conduction through diode 4 even though the cathode terminal of diode 3 is raised to minus twenty-four volts. If a ringing control pulse is present in time position $CH_N$, the output signal from the "and" gate, which is coupled to the base of transistor 1 through resistor 5, rises to minus twenty-four volts. Since the emitter of transistor 1 stands at minus thirty-four volts at this time, transistor 1 is rendered conductive. When transistor 1 becomes conductive, the potential of its collector drops to minus thirty-four volts and because of the cross-coupling through resistor 10, transistor 2 is also rendered conductive. When transistor 2 becomes conductive, relay 8 is energized from minus twenty-four volts through conducting transistor 2, choke coil 7, and through its winding to minus forty-eight volts. Transistor 1 is held conductive from the minus twenty-four volt potential appearing at the collector of transistor 2 and through cross-coupling resistor 6. Thus, it can be seen that once the bi-stable circuit is triggered to its second operated condition, it remains in that condition until it is triggered back to its first operated condition.

The next pulse appearing on conductor $CH_{N-1}$ serves to reset the bi-stable circuit to its first operated condition. During time position $CH_{N-1}$, conductor $CH_{N-1}$ and thus the emitter of transistor 1 rises to minus twenty-four volts and transistor 1 is rendered non-conductive. Transistor 2 is also rendered non-conductive when transistor 1 becomes non-conductive, as previously described.

If a ringing control pulse is again developed in time position $CH_N$, the bi-stable circuit is then again triggered to its second operated condition during time position $CH_N$. Thus, so long as ringing control pulses are developed in time position $CH_N$, the bi-stable circuit is triggered "on" for two thousand five hundred and forty microseconds and triggered "off" for twenty microseconds in each time position frame. Relay 8 is conventional in design and has operate and release times in the order of 4–5 milliseconds. Thus, relay 8 operates shortly after being energized and releases only after ringing control pulses in time position $CH_N$ are no longer developed. At its operated make contacts 11, relay 8 closes the generator 12 to the load 13. Diode 14 is included in the circuit to prevent the inductive surge generated by the winding of relay 8 when it is deenergized from being transmitted to the bi-stable circuit. Choke coil 7 is employed to decouple the relay from the bi-stable circuit so that the winding capacity of relay 8 will not shunt the collector of transistor 2, which would adversely affect the response time of the bi-stable circuit.

While there has been shown and described what is at present considered to be the preferred embodiment of the invention, it will be understood that various modifications may be made therein. For example, the use of the circuit is not restricted to applying ringing power to a telephone line. The circuit could be used to indicate an alarm condition and for many other purposes. The relay controlled by the bi-stable circuit could be replaced by a lamp or any other indicating means which for all practical purposes would give a steady indication so long as trigger pulses were applied to the circuit. Also, a pulse in a time position which does not immediately precede the triggering time position may be used to reset the circuit. The choice of resetting time position is governed by the requirement that the percent make output of the circuit be sufficient to cause the indicating means to give a steady indication. Therefore, it is intended to cover in the appended claims all such modifications as fall within the true spirit and scope of the invention.

What is claimed is:

1. In a time division multiplex system, a trigger circuit having first and second stable operated conditions, means for applying trigger pulses which occur in a first time position in recurring cycles of time positions to said trigger circuit, means for applying trigger pulses which occur in a second time position in said recurring cycles of time positions to said trigger circuit, means whereby said trigger circuit is responsive to the receipt of each pulse in said second time position to operate to its second operated condition and responsive to the receipt of each pulse in said first time position when in its second operated condition to operate to its first operated condition, indicating means, means for energizing said indicating means when said trigger circuit is in its second operated condition, means whereby the time displacement of said first and second time positions is of such time duration that said indicating means is energized for the major portion of each cycle during which the trigger pulses in said second time position are applied to said trigger circuit.

2. In a time division multiplex system, a trigger circuit having first and second stable operated conditions, means for applying trigger pulses which occur in a first time position in recurring cycles of time positions to said trigger circuit, means for applying trigger pulses which occur in a second time position in said recurring cycles of time positions to said trigger circuit, means whereby said trigger circuit is responsive to the receipt of each pulse in said second time position to operate to its second operated condition and responsive to the receipt of each pulse in said first time position when in its second operated condition to operate to its first operated condition, a relay having a predetermined release time period, means for energizing said relay when said trigger circuit is in its second operated condition, means whereby the time displacement of said first and second time positions is of less duration than said predetermined time period so that said relay remains operated so long as pulses in said second time position are applied to said trigger circuit.

3. In a time division multiplex system, means for developing time position defining pulses in recurring cycles of time positions, a trigger circuit having first and second stable operated conditions, means for continuously applying the pulses occurring in a first time position to said trigger circuit, means for applying the pulses occurring in a second time position to said trigger circuit during a plurality of successive time position cycles, means whereby said trigger circuit is responsive to the receipt of each pulse in said second time position to operate to its second operated condition and responsive to the receipt of each pulse in said first time position when in its second operated condition to operate to its first operated condition, indicating means, means for energizing said indicating means when said trigger circuit is in its second operated condition, means whereby the interval between said first and second time positions is of such time duration that said indicating means is energized for the major portion of each cycle during which pulses in said second time position are applied to said trigger circuit.

4. In a time division multiplex system, means for developing time position defining pulses in recurring cycles of time positions, a trigger circuit having first and second stable operated conditions, means for continuously applying the pulses occurring in a first time position to said trigger circuit, means for applying the pulses occurring in a second time position to said trigger circuit during a plurality of successive time position cycles, means whereby said trigger circuit is responsive to the receipt of each pulse in said second time position to operate to its second operated condition and responsive to the receipt of each pulse in said first time position when in its second operated condition to operate to its first operated condition, a relay, means for energizing said relay when said trigger circuit is in its second operated condition, means whereby said relay is operated shortly after being energized and released only after trigger pulses in said second time position are no longer applied to said trigger circuit.

5. In combination, a trigger circuit having first and second stable operated conditions, means for applying first trigger pulses which recur at a given frequency to said trigger circuit, means for applying second trigger pulses which recur at said given frequency but which are displaced in time occurrence from said first trigger pulses to said trigger circuit, means whereby said trigger circuit is responsive to the receipt of each of said second trigger pulses to operate to its second operated condition and responsive to the receipt of a first trigger pulse when in its second operated condition to operate to its first operated condition, indicating means, means for energizing said indicating means only when said trigger circuit is in its second operated condition, means whereby the time displacement of said first and second trigger pulses is of such duration that said indicating means is energized for a greater period of time than it is deenergized so long as said second trigger pulses are applied to said trigger circuit.

6. In combination, a trigger circuit having first and second stable operated conditions, means for applying first trigger pulses which recur at a given frequency to said trigger circuit, means for applying second trigger pulses which recur at said given frequency but which are displaced in time occurrence from said first trigger pulses to said trigger circuit, means for causing said trigger circuit to respond to the receipt of each of said second trigger pulses to operate to its second operated condition and to respond to the receipt of a first trigger pulse when in its second operated condition to operate to its first operated condition, a relay having a predetermined release time period, means for energizing said relay when said trigger circuit is in its second operated condition, means whereby the time displacement of said first and second trigger pulses is less than said predetermined time period so that said relay remains operated so long as said second trigger pulses are applied to said trigger circuit.

7. In combination, a trigger circuit having first and second stable operated conditions, means for continuously applying first trigger pulses which recur at a given frequency to said trigger circuit, means for developing a series of second trigger pulses which recur at said given frequency but which are displaced in time occurrence from said first trigger pulses, means for applying said series of second trigger pulses to said trigger circuit, means responsive to the receipt of each of said second trigger pulses for operating said trigger circuit to its second operated condition, means responsive to the receipt of a first trigger pulse when said trigger circuit is in its second operated condition to operate said trigger circuit to its first operated condition, indicating means, means for energizing said indicating means when said trigger circuit is in its second operated condition, means whereby the time displacement of said first and second trigger pulses is of such duration that said indicating means is energized for the major portion of the time during which said series of second trigger pulses is applied to said trigger circuit.

8. In combination, a trigger circuit having first and second stable operated conditions, means for continuously applying first trigger pulses which recur at a given frequency to said trigger circuit, means for developing a series of second trigger pulses which recur at said given frequency but which are displaced in time occurrence from said first trigger pulses, means for applying said series of second trigger pulses to said trigger circuit, means whereby said trigger circuit is responsive to the receipt of each of said second trigger pulses to operate to its second operated condition and responsive to the receipt of a first trigger pulse when in its second operated condition to operate to its first operated condition, a relay having particular release time characteristics, means for energizing said relay when said trigger circuit is in its second operated condition, means for causing said second pulse to occur after said first pulse before elapse of a time period corresponding to said release time characteristics, whereby said relay operating shortly after being energized and releasing only after the termination of said series of second trigger pulses.

9. In a time division multiplex system, a trigger circuit having first and second stable operated conditions, means for continuously developing first pulses in a first time position in recurring cycles of a plurality of time positions, means for applying said first pulses to said trigger circuit, means for continuously developing second pulses in a second time position in said recurring cycles of time positions, means for intermittently developing control pulses in one or more time positions in said recurring cycles of time positions, gating means for applying a trigger pulse to said trigger circuit only when a control pulse coincides in time position with one of said second pulses, said trigger circuit being responsive to the receipt of each of said trigger pulses to operate to its second operated condition and responsive to the receipt of a first pulse when in its second operated condition to operate to its first operated condition, indicating means, means for energizing said indicating means when said trigger circuit is in its second operated condition, the time displacement of said first and second pulses being of such duration that said indicating means is energized for the major portion of each cycle during which trigger pulses are applied to said trigger circuit.

10. In a time division multiplex system, a trigger circuit having first and second stable operated conditions, means for continuously developing first pulses in a first time position in recurring cycles of a plurality of time positions, means for applying said first pulses to said trigger circuit, means for continuously developing second pulses in a second time position in said recurring cycles of time positions, means for intermittently developing control pulses in one or more time positions in said recurring cycles of time positions, gating means for applying a trigger pulse to said trigger circuit only when a control pulse coincides in time position with one of said second pulses, said trigger circuit being responsive to the receipt of each of said trigger pulses to operate to its second operated condition and responsive to the receipt of a first pulse when in its second operated condition to operate to its first operated condition, a relay, means for energizing said relay when said trigger circuit is in its second operated condition, said relay operating shortly after being energized and releasing only after trigger pulses are no longer applied to said trigger circuit.

References Cited in the file of this patent

UNITED STATES PATENTS

| | | |
|---|---|---|
| 2,718,613 | Harris | Sept. 20, 1955 |
| 2,778,978 | Drew | Jan. 22, 1957 |
| 2,802,940 | Burton | Aug. 13, 1957 |